(12) United States Patent
Lim et al.

(10) Patent No.: US 11,427,602 B2
(45) Date of Patent: Aug. 30, 2022

(54) BIMETALLIC NANOPARTICLES WITH STIMULI-RESPONSIVENESS, PROCESS FOR PRODUCING THE SAME, AND USE THEREOF

(71) Applicant: INDUSTRY-UNIVERSITY COOPERATION FOUNDATION HANYANG UNIVERSITY ERICA CAMPUS, Ansan-si (KR)

(72) Inventors: Dong Woo Lim, Seoul (KR); Eun Young Hwang, Seongnam-si (KR)

(73) Assignee: INDUSTRY-UNIVERSITY COOPERATION FOUNDATION HANYANG UNIVERSITY ERICA CAMPUS, Ansan-si (KR)

(*) Notice: Subject to any disclaimer, the term of this patent is extended or adjusted under 35 U.S.C. 154(b) by 58 days.

(21) Appl. No.: 16/441,362

(22) Filed: Jun. 14, 2019

(65) Prior Publication Data

US 2019/0382420 A1 Dec. 19, 2019

(30) Foreign Application Priority Data

Jun. 15, 2018 (KR) .................. 10-2018-0068665
Jun. 13, 2019 (KR) .................. 10-2019-0070155

(51) Int. Cl.
*C07F 1/08* (2006.01)
*C07F 1/10* (2006.01)
(Continued)

(52) U.S. Cl.
CPC .................. *C07F 1/12* (2013.01); *C07F 1/08* (2013.01); *C07F 1/10* (2013.01); *G01N 21/658* (2013.01); *B82Y 15/00* (2013.01); *B82Y 20/00* (2013.01); *B82Y 30/00* (2013.01); *B82Y 40/00* (2013.01)

(58) Field of Classification Search
CPC ..... C07F 1/08; C07F 1/10; C07F 1/12; G01N 21/658; B82Y 40/00
See application file for complete search history.

(56) References Cited

U.S. PATENT DOCUMENTS

2014/0162067 A1 6/2014 Shahjamali et al.

FOREIGN PATENT DOCUMENTS

| KR | 10-2017-0142947 A | 12/2017 | |
| KR | 20170142947 A * | 12/2017 | ........... C01B 32/182 |

(Continued)

OTHER PUBLICATIONS

Christine M. Schilli, Mingfu Zhang, Ezio Rizzardo, San H. Thang, (Bill) Y. K. Chong, Katarina Edwards, Goran Karlsson,§ and Axel H. E. Muller.A New Double-Responsive Block Copolymer Synthesized via RAFT Polymerization:Poly(N-isopropylacrylamide)-block-poly(acrylic acid).Macromolecules,37,7861-7866 (Year: 2004).*

(Continued)

*Primary Examiner* — Bijan Ahvazi
(74) *Attorney, Agent, or Firm* — NSIP Law

(57) ABSTRACT

The present disclosure provides a bimetallic nanostructure with stimuli-responsiveness, including: a metal seed; a nanogap including a dopamine-modified stimuli-responsive copolymer attached to only a portion of the metal seed; and a metal shell surrounding the nanogap. The bimetallic nanostructure has a controllable interior nanogap, and may be used as a surface-enhanced Raman scattering (SERS) nanoprobe with improved SERS signals by virtue of the presence of the interior nanogap.

15 Claims, 7 Drawing Sheets

(51) Int. Cl.
*C07F 1/12* (2006.01)
*G01N 21/65* (2006.01)
*B82Y 15/00* (2011.01)
*B82Y 40/00* (2011.01)
*B82Y 30/00* (2011.01)
*B82Y 20/00* (2011.01)

(56) References Cited

FOREIGN PATENT DOCUMENTS

| KR | 10-2018-0018376 A | 2/2018 | | |
|---|---|---|---|---|
| KR | 10-2018-0018378 A | 2/2018 | | |
| WO | WO 2017/164822 A1 | 9/2017 | | |
| WO | WO-2017164822 A1 | * | 9/2017 | ........... G01N 21/658 |
| WO | WO 2018/030785 A1 | 2/2018 | | |

OTHER PUBLICATIONS

Jiating He, Ray Chin Chong Yap, a Siew Yee Wong, Yu Zhang, Yating Hu, Chao Chen, Xikui Zhang, John Wang and Xu Li, Controlled growth of a metal-organic framework on gold nanoparticles,CrystEngComm, 2016, 18, 5262-5266 (Year: 2016).*

Tao Chen, Miaoxin Yang, Xinjiao Wang, Li Huey Tan, and Hongyu Chen, Controlled Assembly of Eccentrically Encapsulated Gold Nanoparticles, J. AM. CHEM. SOC. 2008, 130, 11858-11859. (Year: 2008).*

Kneipp, Katrin, et al., "Single Molecule Detection Using Surface-Enhanced Raman Scattering (SERS)," *Physical review letters*, 78, 9, Mar. 3, 1997 (pp. 1667-1670).

Ye, Jian, et al., "Fabrication, Characterization, and Optical Properties of Gold Nanobowl Submonolayer Structures," *Langmuir*, 25, 3, 2009 (pp. 1822-1827).

Li, Cuncheng, et al., "One-Pot Controllable Synthesis of Au@Ag Heterogeneous Nanorods with Highly Tunable Plasmonic Absorption," *Chemistry of Materials*, 25, 13, 2013 (pp. 2580-2590).

Sun, Changlong, et al., "Surface-enhanced Raman scattering (SERS) imaging-guided real-time photothermal ablation of target cancer cells using polydopamine-encapsulated gold nanorods as multifunctional agents," *Analytical and bioanalytical chemistry*, 409, 20, 2017 (pp. 4915-4926).

* cited by examiner

BIMETALLIC NANOPARTICLES WITH STIMULI-RESPONSIVENESS, PROCESS FOR PRODUCING THE SAME, AND USE THEREOF

TECHNICAL FIELD

The present disclosure relates to a bimetallic nanostructure with stimuli-responsiveness, clusters thereof, a process for producing the same, and use thereof. Particularly, the present disclosure relates to a bimetallic nanostructure having an interior nanogap between a core metal and shell metal, and use thereof for application as a nanoprobe in surface-enhanced Raman scattering (SERS).

BACKGROUND ART

Raman spectrometry has been studied for the purpose of detection and identification of pathogens. Particularly, surface-enhanced Raman scattering (SERS) has been given many attentions in terms of spectroscopic detection and identification of small molecules, nucleic acids, proteins and cells by virtue of its ultrahigh sensitivity, narrow band width and significant multiplexing capability (Non-Patent Document 1).

Compartmentalized nanostructures are of great interest for a variety of applications, because they can provide different physicochemical properties and dual surface functionalities within a single particle, which are inconceivable for a single particle. In particular, when symmetry is broken, it is possible to allow specific functionalization for a wide range of organization into a well-defined structure with newly emerging properties. Considerable efforts have been made during the past decades for synthesis of compartmentalized nanostructures via molecularly controlled interactions between ligands. These ligands can be fully mixed, separated into stripe-like domains or completely demixed depending on their structures and chemical incompatibility.

When metallic nanoparticles (MNPs) are assembled into superparticular nanostructures, higher surface-enhanced Raman scattering (SERS) efficiency is obtained by virtue of large electromagnetic field enhancement at junctions between the MNPs. The SERS properties depend on the MNP morphology and degree of aggregation and form highly localized regions in the electromagnetic field called as hot spots.

With high sensitivity and fingerprint ability for producing distinct spectra among various molecules having similar structures and functions, SERS has been widely applied for biosensing applications to detect small molecules, nucleic acids and proteins. Especially, BMNPs can exhibit unique localized surface plasmon resonance properties, which are different from the single component NPs, due to the electronic coupling between two metallic compartments. Furthermore, the broken symmetry of the BMNPs, such as an eccentric or dimeric form, can lead to diverse plasmon modes and coupling modes to provide much stronger electromagnetic field and SERS intensity. However, controlled synthesis of asymmetrically compartmentalized BMNPs with an optimal size and morphology is challenging, because most of conventional methods involve complicated procedures and extreme reaction conditions (Non-Patent Document 2). In this regard, there is a need for an easy method for binding a stimuli-responsive polymer to BMNPs in order to dynamically tailor and control the distance between nanogaps.

Under these circumstances, the present inventors have conducted studies continuously about easy synthesis of bimetallic nanostructures with a nanogap through competitive coordination of two ligands to a seed metal, and thus have finished the present disclosure.

REFERENCES (Non-Patent Document 1) K. Kneipp, Y. Wang, H. Kneipp, L. T. Perelman, I. Itzkan, R. R. Dasari, et al., "Single Molecule Detection Using Surface-Enhanced Raman Scattering (SERS)," Physical Review Letters, vol. 78, pp. 1667-1670, Mar. 3, 1997.

(Non-Patent Document 2) Li, C.; Sun, L.; Sun, Y.; Teranishi, T. One-pot controllable synthesis of Au@ Ag heterogeneous nanorods with highly tunable plasmonic absorption. Chemistry of Materials 2013, 25 (13), 2580-2590.

DISCLOSURE

Technical Problem

A technical problem to be solved by the present disclosure is to provide a bimetallic nanostructure with stimuli-responsiveness.

Another technical problem to be solved by the present disclosure is to provide a metal nanoprobe using the bimetallic nanostructure according to the present disclosure for detection of a surface-enhance Raman scattering-based target material.

Still another technical problem to be solved by the present disclosure is to provide a method for producing the bimetallic nanostructure.

Technical Solution

In one general aspect, there is provided a bimetallic nanostructure with stimuli-responsiveness, including:

a metal seed;

a nanogap including a dopamine-modified stimuli-responsive copolymer attached to only a portion of the metal seed; and a metal shell surrounding the nanogap.

As used herein, 'bimetal' means two types of metals forming the metal core-metal shell structure. Herein, the bimetallic nanostructure is expressed in the form of 'core metal @ shell metal'.

As used herein, the term 'nanogap' means a nano-sized gap present between the core metal and shell metal.

Herein, the nanogap does not surround the whole metal seed but the stimuli-responsive copolymer is deposited and formed only at a portion of one side of the metal seed. In other words, the stimuli-responsive copolymer is eccentrically deposited to form a nanostructure. This is because a small molecule ligand and the stimuli-responsive copolymer (polymeric ligand) are 'competitively coordinated' to the seed metal.

As used herein, the term 'coordinate bond' means a bond formed by donation of electrons from one atom to the other atom participating in the bond, unlike a covalent bond formed by sharing electrons between atoms participating in the bond. Such a coordinate bond is a kind of covalent bond, and thus ultimately results in the form of a covalent bond.

When a small molecule ligand is bound to the surface of seed metal, the corresponding portion does not allow binding of a stimuli-responsive copolymer containing a polymeric ligand. Therefore, the seed metal portion to which the small molecule ligand is bound is not exposed to the polymeric ligand but only the seed metal portion to which the polymeric ligand is bound can grow to form a nanogap.

As used herein, the term 'dopamine-modified stimuli-responsive copolymer' means a stimuli-responsive copolymer to which dopamine is bound (see, FIG. 1).

The bimetallic nanostructure may further include a crosslinked polydopamine layer surrounding the surface of metal shell.

Facile methods for reducing metal precursors in-situ are highly desirable for synthesis of BMNPs. Noble metallic nanoparticles (MNPs) including gold and silver were typically synthesized in solution with reducing agents, such as sodium citrate, citric acid and ascorbic acid. On the other hand, a phenolic hydroxyl group, catechol can reduce metal precursors to MNPs in the absence of any external reducing agents and have a number of advantages in forming interfaces between MNP surfaces and organic molecules.

Dopamine contains catechol. A molecule containing catechol as a redox (oxidation-reduction) active phenolic group may be used as a reducing agent for forming and growing metal nuclei. Typically, the phenolic catechol of polydopamine is oxidized into quinone through Michael addition and Schiff base reactions under an alkaline condition and undergoes self-polymerization spontaneously to form oligomers.

When metals are strongly coordinated with the catechol groups via two adjacent hydroxyl groups, in-situ MNPs surrounded by a crosslinked catechol-based polymer shell are formed by Michael addition and Schiff base reactions. Specifically, dopamine-containing molecules have been widely used for synthesis of MNPs by catechol redox (oxidation-reduction) coupling, and can also provide flexible control of the nanogapped MNPs in terms of gap size. These plasmonic nanogapped nanoparticles with built-in gaps separating a core from a shell are formed through gold nucleation and growth by using dopamine as a reducing agent, and their interior nanogaps are tailored and controlled by the polydopamine thickness.

Particularly, a stably crosslinked polydopamine shell can be formed on the MNP surface and fix Raman molecules through thiol-quinone covalent binding.

Such core-shell nanostructures create a confined electromagnetic field in the nanogap, and their optical properties depend on the nanogap size, representing SERS hot spots. In this regard, the BMNPs with the interior nanogaps are expected to have highly enhanced optical properties by virtue of a plasmonic coupling effect and an intense electromagnetic field in the nanogap.

Although the interior nanogap size can be controlled by adding different concentrations of reducing agents, incorporation of stimuli-responsive copolymers acting as linkers to the MNPs are highly desirable to reversibly tune their plasmonic properties via molecular conformational changes in response to stimuli, such as pH, ligands and temperature. It is well known that poly(N-isopropylacrylamide) (PNIPAM) bound to a metal core can control SERS activity by thermal-induced swelling and collapse of the polymer chain at a lower critical solution temperature (LOST) in aqueous solution. These conformational changes are expected to reversibly affect the optical properties of MNPs by affecting the overall dimensions and thermo-control of interparticle distances between the anchored metal nanoparticles in response to a temperature change.

Each of the core metal and shell metal may be selected from the group comprising silver, gold, copper and a combination thereof, but is not limited thereto. Any metal used widely in the art may be used with no particular limitation. In addition, the core metal and shell metal may not be the same.

The stimuli-responsive copolymer may be a diblock copolymer consisting of a hydrophilic polymer block and a stimuli-responsive polymer block.

As used herein, the term 'stimuli-responsiveness' means a property involving a change in behavior in response to stimuli (such as heat).

The hydrophilic polymer block may be selected from the group comprising poly(acrylic acid), poly(methacrylic acid), poly(itaconic acid), poly(maleic acid) and a combination thereof, but is not limited thereto. Preferably, the hydrophilic polymer block may be poly(acrylic acid).

The stimuli-responsive polymer block may be selected from the group comprising poly(N-isopropyl acrylamide) (polyNIPAM), poly(N,N'-diethyl acrylamide) (polyDEAAm), poly(dimethylaminoethyl methacrylate) (polyDMAEMA), poly(N-(L)-(1-hydroxymethyl)propyl methacrylamide), Poly[oligo(ethylene glycol) methyl ether methacrylate (POEGMA), poly(2-vinyl pyridine) (P2VP), poly(4-vinyl pyridine) (P4VP) and a combination thereof, but is not limited thereto. Preferably, the stimuli-responsive polymer may be poly(N-isopropyl acrylamide).

The nanogap size is increased at a temperature less than the lower critical solution temperature of the stimuli-responsive copolymer, while it is decreased at a temperature equal to or more than the lower critical solution temperature of the stimuli-responsive copolymer. In this manner, the nanogap size may be controlled by temperature.

The term 'lower critical solution temperature (LOST)' means the temperature at which point a conformational change of a temperature-sensitive polymer appears.

According to the present disclosure, the stimuli-responsive copolymer (e.g. poly(N-isopropylacrylamide) (polyNIPAM)) functions as a linker of the metal core and metal shell and forms the nanogap. The stimuli-responsive copolymer chain shows a phase transition behavior from a swelled state to a dehydrated state, as the temperature in aqueous solution is increased (i.e. at the lower critical solution temperature (LOST)).

Therefore, the stimuli-responsive bimetallic nanostructure according to the present disclosure undergoes a collapse of the stimuli-responsive copolymer from a swelled state to a dehydrated state, when the temperature in aqueous solution is increased to reach the LOST or higher of the stimuli-responsive copolymer, resulting in a decrease in nanogap size. In other words, it is possible to control the nanogap size as a function of temperature.

The bimetallic nanostructure may further include a Raman dye in the nanogap.

The Raman dye means a Raman-active organic compound, and any Raman dye used widely in the art may be used with no particular limitation. Particularly, the Raman dye may be selected from the group comprising malachite green isothiocyanate (MGITC), rhodamine B isothiocyanate (RBITC), rhodamine 6G, adenine, 4-amino-pyrazol(3,4-d) pyrimidine, 2-fluoroadenine, N6-bezoyladenine, kinetin, dimethyl-allyl-amino-adenin, zeatin, bromo-adenine, 8-aza-adenine, 8-aza-quanine, 4-mercaptopyridine, 6-mercaptopurin, 4-amino-6-mercaptopyrazolo(3,4-d)pyrimidine, 8-mercaptoadenine, 9-amino-acridine and a combinations thereof, but is not limited thereto.

The bimetallic nanostructure may have an eccentric or heterodimeric form.

The morphology of the nanostructure according to the present disclosure may be controlled by varying the ratio of the two ligands, and thus two different ligands may cover the seed metal surface at a different coverage ratio. In other words, the bimetallic nanostructure according to the present disclosure has a controllable form and various growth modes can be made by adjusting the ratio of ligands.

As described above, competitive coordination of two ligands (small molecule ligand and polymeric ligand) is used to produce the bimetallic nanostructure according to the present disclosure. When a larger amount of polymeric ligand is bound to the seed metal, regions to which the small ligand may be bound are reduced relatively. The seed metal portion to which the small molecule ligand is bound is exposed as it is, while the portion to which the polymeric ligand is bound is grown to form the nanogap. When the ratio of polymeric ligand is increased, the seed metal coverage ratio of the polymeric ligand is increased, thereby providing an eccentric form of bimetallic nanostructure (FIG. 1(a)). On the other hand, when the ratio of polymeric ligand is decreased, the seed metal coverage ratio of the polymeric ligand is reduced and the coverage ratio of the small molecule ligand is increased so that the seed metal may be more exposed, thereby providing a heterodimeric form of nanostructure (FIG. 1(b)). In other words, it is possible to obtain an eccentric or heterodimeric form of bimetallic nanostructure by controlling the ratio of the two ligands.

In another general aspect, there is provided a bimetallic nanocluster structure formed by aggregation of the bimetallic nanostructures.

The term 'nanocluster' means a structure formed by aggregation of nanoparticles. As mentioned above, the seed metal portion to which the small molecule ligand is bound is present in an exposed state, and thus can cause aggregation of nanoparticles through a salt-induced reaction in the presence of a basic solution to form nanoclusters.

In still another general aspect, there is provided a metal nanoprobe for determination of surface-enhanced Raman scattering (SERS) signals using the bimetallic nanostructure according to the present disclosure.

The bimetallic nanostructure according to the present disclosure may include a Raman dye so that it may be provided as a metal nanoprobe for determination of surface-enhanced Raman scattering signals.

As used herein, 'probe' means a material which can bound specifically with a target material to be detected, and allows identification of the target material through the binding.

As used herein, 'nanoprobe' means a nanosized probe.

Herein, 'nano' covers a range of dimension generally understood by those skilled in the art. Particularly, the range may be 0.1-1000 nm, particularly 10-1000 nm, more preferably 20-500 nm, and even more preferably 40-250 nm.

In yet another general aspect, there is provided a method for producing a bimetallic nanostructure with stimuli-responsiveness, including the steps of:

i) preparing a seed metal;

ii) adding a small molecule ligand and a thiol-terminated stimuli-responsive copolymer as a polymeric ligand to the seed metal;

iii) carrying out competitive coordination of the small molecule ligand and the polymeric ligand onto the metal seed and allowing the seed metal to be bound with the thiol groups so that the stimuli-responsive copolymer may be deposited only at a portion of the metal seed, thereby forming a nanogap;

iv) adding dopamine to the seed metal mixture having a nanogap formed from step iii) to introduce catechol groups to the stimuli-responsive copolymer; and v) adding a metal precursor to the stimuli-responsive copolymer modified with the seed metal-dopamine so that catechol may be oxidized and the metal precursor ions may be reduced via catechol-mediated redox reactions without any reducing agent, thereby forming a metal shell and providing a bimetallic nanostructure including a metal seed-nanogap-metal shell.

In step ii), it is possible to obtain an eccentric or heterodimeric form of bimetallic nanostructure by controlling the addition ratio of the small molecule ligand and polymeric ligand, as described above.

The small molecule ligand may be at least one selected from the group comprising diethylamine, 4-aminothiophenol (ATP), 1,4-benzenedithiol (BDT), 4-mercaptobenzoic acid (MBA) and 2-mercaptobenzoimidazole-5-carboxylic acid (MBIA), but is not limited thereto.

The small molecule ligand has a thiol group (—SH) and/or amine group (—$NH_2$) as a reactive group.

In addition, the thiol-terminated stimuli-responsive copolymer functions as a polymeric ligand.

The stimuli-responsive copolymer as a polymeric ligand may be a diblock copolymer including a hydrophilic polymer block and stimuli-responsive polymer block, but is not limited thereto. The hydrophilic polymer and stimuli-responsive polymer are the same as described above.

After step v), the method may further include a step of controlling the nanogap size by varying temperature.

After step v), the method may further include a step of adding a salt solution to cause aggregation of the bimetallic nanostructures by salt-induced reaction, thereby forming bimetallic nanoclusters.

The core metal and shell metal are the same as described above.

According to an embodiment of the present disclosure as described hereinafter, there is provided synthesis of an eccentric or heterodimeric form of stimuli-responsive bimetallic nanostructure via competitive ligand coordination between two immiscible ligands. A thermally responsive diblock copolymer, poly(acrylic acid-block-N-isopropylacrylamide) (PAAc-b-PNIPAM) as a polymeric ligand was synthesized via reversible addition-fragmentation chain transfer polymerization, and dopamine was chemically conjugated with its hydrophilic PAAc block. The other ligand, mercaptobenzoic acid (MBA) was used for directional clustering of the compartmentalized BMNP. When both ligands were competitively bound to Au seeds to form completely demixed domains, the silver precursors were reduced by catechol redox coupling to form the second Ag metallic compartment onto the Au seeds. Eccentric or heterodimeric BMNPs with different patchy patterns were synthesized by controlling molar ratios of two ligands, and were directionally clustered into supraparticular nanostructures via salt-induced aggregation, leading to largely enhanced surface-enhanced Raman scattering (SERS) signals due to electromagnetic field enhancement at interparticle junctions. As MBA molecules that can be used also as Raman dyes were further added and simultaneously embedded in the nanogap of the BMNPs during the redox reaction, their optical properties were further enhanced via conformational changes of PNIPAM blocks present in the nanogap between Au- and Ag compartments above the transition temperature. Therefore, there is provided an anisotropic multi-metallic nanostructure useful for SERS-based biosensing applications.

Advantageous Effects

The bimetallic nanostructure having an interior nanogap according to the embodiments of the present disclosure reacts in response to a change in temperature to control the nanogap size and to provide an effect of enhancing SERS signals. In addition, an eccentric or heterodimeric form of bimetallic nanostructure obtained by controlling the added amounts of two ligands and cluster nanostructures thereof may also be applied as metal nanoprobes for determination of surface-enhanced Raman scattering (SERS) signals with significantly improved Raman intensity.

BRIEF DESCRIPTION OF DRAWINGS

In FIG. 1, (c) shows a reaction scheme of catechol-mediated redox (oxidation-reduction).

FIG. 3 shows (c) the GPC traces of PtBA and PtBA-b-PNIPAM, (d) UV-Vis absorption graph of PtBA-b-PNIPAM before and after aminolysis, the intrinsic thermal transition behavior of PAAc$_{145}$-b-PNIPAM$_{300}$ determined by measuring (e) UV absorbance and (f) hydrodynamic radius.

MODES FOR INVENTION

Figure 1:
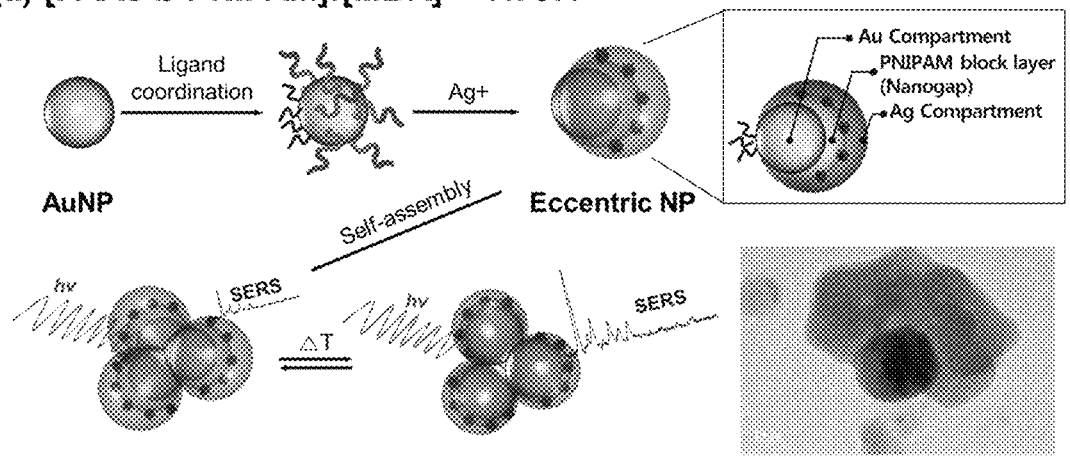
FIG. 1 shows schematic views of anisotropic and compartmentalized (a) eccentric bimetallic nanoparticles (BMNPs) and (b) heterodimeric BMNPs, formed via competitive ligand coordination between two immiscible ligands at different molar ratios onto Au seeds and Ag ion reduction of redox-active ligands bound onto Au seeds. When the BMNPs are assembled directionally into superparticular nanostructures via salt-induced aggregation (formation of nanoclusters), SERS signals are significantly enhanced by virtue of large electromagnetic field enhancement at junctions between particles. In addition, as the thermally responsive polymer is positioned in the nanogap between Au and Ag compartments, the interior nanogap distance is controlled to in response to a temperature change, while the structure of a PNIPAM block is changed, and optical properties of BMNPs are enhanced. The inset transmission electron microscopic (TEM) images show an eccentric- and dimeric form of BMNPs, wherein the scale bars represent (a) 10 nm and (b) 20 nm.
Figure 1:
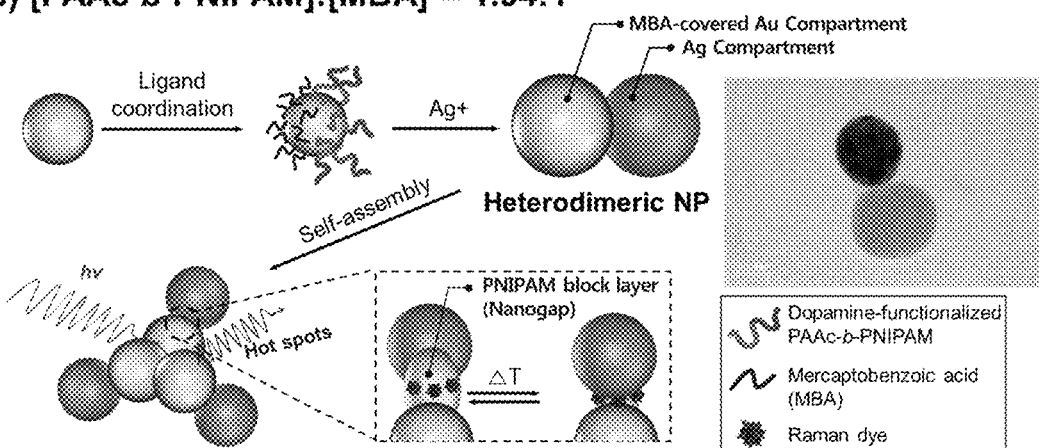
Figure 1:
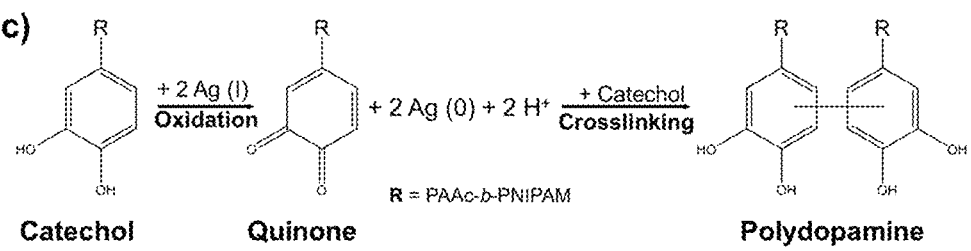

Examples will be described more fully hereinafter so that the present disclosure can be understood with ease. However, the following examples are for illustrative purposes only and the scope of the present disclosure is not limited thereto. It is to be understood that any embodiments that can be easily inferred from the specification and examples by those skilled in the art are included in the scope of the present disclosure. In addition, the disclosures of references are incorporated herein.

Example 1: Materials and Methods 1-1: Materials

Gold (III) chloride trihydrate (HAuCl$_4$.3H$_2$O), sodium citrate tribasic dehydrate (99.0%), silver nitrate (99%), 4-cyano-4-[(dodecylsulfanyl thiocarbonyl) sulfanyl]pentanoic acid (CDTPA), tert-butyl acrylate (tBA), trifluoroacetic acid, hexylamine, methyl-methanethiosulfonate (MTS), hexylamine, triethylamine, tris(2-carboxyethyl) phosphine hydrochloride (TCEP), sulfo-N-hydroxysuccinimide ester (sulfo-NHS), phosphate buffered saline (PBS), mercaptobenzoic acid (MBA), dichloromethane (DCM), 1,4-dioxane, diethyl ether, tetrahydrofuran (THF), chloroform, isopropanol (IPA) and methanol were purchased from Sigma-Aldrich (St Louis, Mo., USA). Magnetic beads (MBs) with a carboxylic group were purchased from Bioneer Corporation (Daejon, South Korea). Thiol poly(ethylene glycol) (PEG) carboxylic acid (Molecular weight: 3000) was obtained from Polyscience (Warrington, Pa.). In addition, 1-ethyl-3-(3-dimethylaminopropyl) carbodiimide (EDC) was purchased from Thermo Scientific (Rockford, Ill., USA). N-isopropylacrylamide (NIPAM) with 97% was obtained from Tokyo Chemical Industry Co. Ltd. (TCI, Japan), and purified by recrystallization from n-hexane. A thermal radical initiator, 2,2'-azobis(2-methylpropionitrile) known as azobisisobutyronitrile (AIBN) was obtained by purifying 2,2'-azobis(2-methylpropionitrile) purchased from Acros (Thermo Fisher Scientific, Waltham, Mass., USA) through recrystallization from methanol. Further, tBA was distilled under reduced pressure before use. Deionized water purified by Milli-Q (Millipore Water Purification Systems; EMD Millipore, Bedford, Mass., USA) was used in all the experiments.

1-2: Synthesis of Poly(Tert-Butyl Acrylate) Macro-CTA (PtBA-CTA)

Prior to synthesis, NIPAM monomers were purified by dissolving them in n-hexane at 40° C. and recrystallized below 4° C. to remove any impurities including inhibitors. Next, 10 g of NIPAM was dissolved in 200 mL of n-hexane in a beaker to a concentration of 5 w/v %. Once crystalline NIPAM was formed at low temperature, the solution was filtered through a filter paper (Whatman® qualitative filter paper grade 1) by an aspirator instrument (EYELA 1000S, US) and the product was dried under vacuum to remove n-hexane. Then, tBA was purified by distillation at 40° C. under reduced pressure to remove polymerization inhibitors. In a typical procedure, PtBA macro-chain transfer agent (PtBA-CTA) was synthesized by reversible addition fragmentation chain transfer (RAFT) polymerization in 1,4-dioxane using CDTPA and AIBN as an RAFT agent and initiator, respectively. Then, tBA (24 mL, 136.0 mmol), CDTPA (0.274 g, 0.68 mmol) and 1, 4-dioxane (100 mL) were added into a 200 mL Schlenk flask equipped with a magnetic bar. The mixture was degassed with nitrogen for 30 minutes, and AIBN (0.022 g, 0.136 mmol) was added to the reaction mixture to initiate polymerization reaction under the condition of [monomer]/[CTA]/[Initiator]=1000/5/1. The flask was placed in a water bath at 60° C. for 5 hours, and the polymerization was quenched by rapid cooling in ice-cold water. The resultant PtBA-CDTPA was obtained by precipitation three times in a 5:5 mixture of methanol/water. The precipitate was filtered and dried in a vacuum oven overnight.

1-3: Synthesis of Poly(Tert-Butyl Acrylate-Block-N-Isopropylacrylamide) (PtBA-b-PNIPAM) with Terminal Thiocarbonylthio Groups PtBA-b-PNIPAM was synthesized by RAFT polymerization of NIPAM in 1, 4-dioxane under the condition of [NIPAM]:[PtBA-CTA]:[AIBN]=1500:5:1. Briefly, PtBA$_{145}$-CTA (6.13 g, 0.33 mmol, Mn$_{NMR}$=18,580 g/mol) and NIPAM (11.3 g, 99.4 mmol) were dissolved in 60 mL of 1, 4-dioxane, and degassed with nitrogen gas for 30 min. Then, AIBN (0.003 g, 0.0018 mmol) was added to the solution, and the solution was placed in a water bath at 60° C. After 6 hours, the polymerization reaction was stopped by immersing the flask in ice-cold water, and the solution was exposed to air. PtBA-b-PNIPAM was purified by precipitating the solution into ether in order to remove unreacted monomers and initiators, and dried in a vacuum oven overnight.

1-4: Aminolysis of RAFT Terminal Group of PtBA-b-PNIPAM

Since the thiocarbonylthio group remained as a masked thiol, the trithiocarbonate group of PtBA-b-PNIPAM was cleaved by using a nucleophilic reagent, MTS as a thiol-based coupling chemical agent. In a typical procedure, PtBA-b-PNIPAM (95 μmol), MTS (180 μL, 1.9 mmol), hexylamine (2.52 mL, 19 mmol) and triethylamine (2.66 mL, 19 mmol) were dissolved in 10 mL THF, and the mixture solution was stirred for 24 hours at room temperature. The polymer solution was precipitated three times in hexane, and the polymer with methyl disulfide was dried in a vacuum oven overnight.

1-5: Synthesis of Poly(Acrylic Acid-Block-N-Isopropylacrylamide) (PAAc-b-PNIPAM)

Negatively charged PAAc-b-PNIPAM was prepared via a hydrolysis process of tBA groups of PtBA-b-PNIPAM. In a typical procedure, PtBA-b-PNIPAM (38 μmol) and TFA (5.83 mL, 76 mmol) were dissolved in 20 mL of DCM. After 24 hours, a light brown gelatinous mass was formed and precipitated from the solution. The resultant mass was dissolved in THF, and the solution was dialyzed against deionized water for 2 days. The PAAc-b-PNIPAM with methyl disulfide was transferred to 10 mM Tris buffer at pH 7.0, and reduced by using TCEP at a 10:1 molar ratio to the polymer, thereby forming a terminal free thiol group. After 12 hours at room temperature, the solution was transferred to a presoaked dialysis tubing, dialyzed against deionized water for 2 days and freeze-dried by a lyophilizer MCFD8508 (Ilshin lab co., Ltd., Korea) under vacuum.

1-6: Polymer Characterization

The chemical composition of each of PtBA, PtBA-b-PNIPAM and PAAc-b-PNIPAM was analyzed by a $^1$H nuclear magnetic resonance ($^1$H NMR) instrument (AVANCE III 400, Bruker BioSpin AG, Fallanden, Switzerland) operating with a frequency of 400 MHz by using dimethyl sulfoxide (d-6) and chloroform-d (CDCl$_3$) as solvents. Gel-permeation chromatography (GPC) was carried out by a high-performance liquid chromatography (HPLC) 1260 series instrument (Agilent Technologies, Palo Alto, Calif., USA) equipped with a refractive index (RI) detector using a Shodex GPC column KF-803 (Shodex GPC system-21; Showa Denko Co., Tokyo, Japan). Tetrahydrofuran (THF) was used as eluent at a flow rate of 1.0 mL/min. The system was calibrated with a series of polystyrene standards within a range of 1,270 to 139,000 g/mol. UV absorbance measurement at 350 nm was performed on a UV-Vis spectrometer Cary-100 Bio (Varian Biotech, US) equipped with a peltier thermostated temperature controller. Samples were prepared in PBS at 0.1 w/v % for analysis of thermal properties of the copolymers as a function of temperature from 20° C. to 70° C. at a heating rate of 1° C./minute. Dynamic light scattering (DLS) measurement was carried out on a Zeta-sizer Nano ZS90 (Malvern Instruments, Malvern, UK) instrument equipped with a He—Ne laser at a wavelength of 633 nm with a scattering angle of 90°. Cleavage of trithiocarbonate groups was analyzed by scanning the UV absorbance of the polymer solutions using UV-Vis Spectrometer Shimadzu model UV-1800 series (Shimadzu, Japan). Each polymer sample was prepared in chloroform at 0.5 w/v %, and scanned at wavelength ranging from 200 nm to 700 nm.

1-7: Synthesis of Gold Nanoparticles (AuNPs)

Citrate-capped gold nanoparticles (AuNPs) were synthesized through a seeded-growth method using citrate reduction procedure (Feng, Y.; He, J.; Wang, H.; Tay, Y. Y.; Sun, H.; Zhu, L.; Chen, H. An unconventional role of ligand in continuously tuning of metal-metal interfacial strain. Journal of the American Chemical Society 2012, 134 (4), 2004-2007, Frens, G. Controlled nucleation for the regulation of the particle size in monodispersed gold suspensions. Nature 1973, 241 (105), 20-22). In a representative experiment, stock solution of gold (III) chloride trihydrate was added to 100 mL of deionized water to give a total concentration of 0.01%, and the solution was boiled under vigorous stirring while 1.5 mL of 1% of sodium citrate solution was rapidly added to the boiling solution. The solution changed into a wine red color within 5 minutes, indicating reduction of gold ions, and the reaction was allowed to proceed further for 20 minutes. The resultant AuNPs were used as seeds without purification. To a solution of AuNPs, 50 mL of deionized water was added. Then, 0.05 mL of NaOH solution (6.6 mg/mL) was added dropwise thereto, followed by rapid addition of 0.5 mL of sodium citrate (10 mg/mL) and 0.5 mL of gold (III) chloride hydrate (10 mg/mL). The reaction mixture was stirred while it was heated for 20 minutes. After that, 100 mL of deionized water, 0.2 mL of NaOH, 1 mL of sodium citrate and 1 mL of gold (III) chloride hydrate were sequentially added to the flask, and incubated for 20 minutes under reflux. This process was repeated twice and additional 2 cycles were performed by using 0.2 mL of NaOH, 1 mL of sodium citrate and 1 mL of gold (III) chloride hydrate during incubation for 20 minutes. The resultant AuNP solution was cooled to room temperature, and diluted for further experiments.

1-8: Synthesis of Compartmentalized BMNPs

The prepared AuNPs were used as the seeds to grow Ag compartments via a catechol-mediated redox reaction. In a typical experiment, concentrated AuNPs (2 mL) were added gradually to the mixed solution of IPA (7.6 mL) and deionized water (2.4 mL). PAAc-b-PNIPAM (5.16 μM) and MBA (0.04 mM) were added to the solution, and the mixture solution was stirred for 2 hours. After the solvent was exchanged to deionized water by dialysis, the carboxylic group of the copolymer on the AuNPs was activated by adding a 100-fold molar excess of EDC and sulfo-NHS to PAAc-b-PNIPAM. Then, a 100-fold molar excess of dopamine was added to the solution, and reacted for 1 hour at room temperature. After the reaction, the resultant particles were centrifuged at 6,000 rpm for 10 minutes and resuspended in deionized water. To carry out embedding of Raman molecules within the nanogap of the BMNPs, MBA containing diametrically distributed thiol groups and carboxylic groups was added to the solution, and incubated for 1 hour. The Ag shell compartment of the BMNPs was formed by adding a 100-fold molar excess of silver nitrate under a basic condition. The pH of the particle solution was adjusted by adding NaOH to synthesize a heterodimeric form of BMNPs. After carrying out reaction overnight, the MBA-embedded BMNPs were purified by centrifugation at 6,000 rpm for 10 minutes, and further used as SERS nanoprobes for SERS detection. Likewise, MBA (0.01 mM) was used to synthesize an eccentric form of BMNPs by the same method.

1-9: Characterization of Compartmentalized BMNPs

UV-Vis absorption spectra of BMNPs and their clusters were recorded by a UV-visible spectrometer (UV-1800, Shimadzu, Japan) with a variable wavelength of 200 to 900 nm and a fixed slit width of 1 nm. The baseline was corrected by using two blank cells filled with deionized water. Hydrodynamic diameter, size distribution and ζ-potentials were measured by using DLS (Zeta-sizer Nano ZS90; Malvern Instruments, Malvern, UK) provided with a Ne—He laser operating at 633 nm with a maximum power of 5 mW and a scattering angle of 90°. Transmission electron microscopic (TEM) images were collected by a JEM-2100F FE-STEM (JEOL, Germany) at an accelerated voltage of 200 kV. The dispersion of BMNPs was dropped on a 400-mesh copper grid coated with an ultrathin layer of carbon (Ted Pella, Inc. U.S.). The SERS spectra were recorded by using a Renishaw inVia Raman microscope system (Renishaw, UK). A 12.5 mW Renishaw He—Ne laser was used as an excitation source operating at a wavelength (A) of 632.8 nm. The BMNP solutions were loaded into small glass capillaries (Kimble Chase, plain capillary tubes, soda lime glass, inner diameter: 1.1-1.2 mm, wall: 0.2±0.02 mm, length: 75 mm), and all SERS spectra were collected for an exposure time of 1 second in a wavenumber ranging from 608 to 1738 $cm^{-1}$.

1-10: Calculation of the Enhancement Factor (EF)

The EF of MBA-embedded BMNPs was calculated through the following equation:

$$EF = \frac{I_{SERS}}{N_{SERS}} / \frac{I_{NR}}{N_{NR}} = \frac{I_{SERS}}{I_{NR}} \times \frac{N_{NR}}{N_{SERS}}$$

wherein $I_{SERS}$ and $I_{NR}$ are the intensities for SERS and normal Raman spectra at 1586 $cm^{-1}$, respectively. $N_{SERS}$ and $N_{NR}$ correspond to the number of molecules involved in SERS measurement and normal Raman setting, respectively. $N_{NR}$ was determined based on the Raman spectrum of 10 mg/mL of MBA dissolved in ethanol. $N_{SERS}$ was calculated by assuming that the MBA molecules were adsorbed as a monolayer with a molecular footprint of 0.5 $nmol/cm^2$. Image analysis software was used to calculate the average dimension of AuNPs.

Example 2: Results

FIG. 1 shows schematic views of an eccentric- and heterodimeric form of compartmentalized BMNPs with anisotropy via competitive ligand coordination between two immiscible ligands at different molar ratios onto Au seeds. The present inventors prepared compartmentalized BMNPs by using both competitive coordination of two ligands to form completely demixed domains and catechol-mediated redox chemistry using dopamine-modified PAAc-b-PNIPAM. As shown in FIG. 1(a), PAAc-b-PNIPAM and MBA were competitively coordinated onto the Au seeds via Au-thiol binding at a molar ratio of MBA to PAAc-b-PNIPAM of 7.75, and dopamine was covalently bound within the PAAc block. Silver nitrate was added to form the Ag compartment on the dopamine-modified PAAc block via coupling of catechol oxidation and reduction of silver ions, resulting in formation of eccentric BMNPs as shown in the inset TEM image. In addition, the MBA molecule as a Raman dye was simultaneously encapsulated within the nanogap via Michael addition reaction between catechol and thiol during the redox reaction. When the eccentric BMNPs were directionally assembled into supraparticular nanostructures via salt-induced aggregation, SERS signals were greatly enhanced due to electromagnetic field enhancement at interparticle junctions. Furthermore, as the thermally sensitive polymer is positioned in the nanogap between the Au and Ag compartments, the distance of interior nanogap may be controlled by a conformational change of the PNIPAM block from a hydrated state to a dehydrated state in response to a temperature change, and optical properties of BMNPs may be enhanced above the transition temperature. FIG. 1(b) shows a scheme for synthesis of heterodimeric BMNPs. A different patchy pattern of the BMNPs was obtained by using a different molar ratio of MBA to PAAc-b-PNIPAM of 1.94, as compared to that of eccentric BMNPs. Ag ions were reduced, forming into the second Ag metallic compartment onto the Au seeds, as shown in the inset TEM image. During the redox reaction, MBA was encapsulated within the interior nanogap, resulting in intense plasmonic optical properties. The heterodimeric BMNPs with sharp plasmonic junction regions between the Au and Ag compartments exhibit stronger LSPR and SERS signals as compared to symmetric MNPs, due to diverse plasmon couplings generated in narrow plasmonic junctions. In addition, the decreased nanogap of the heterodimeric BMNPs led to an increase in electromagnetic field intensity above LOST of the copolymer, which would be useful in highly sensitive SERS applications. FIG. 1(c) shows a reaction scheme for a catechol-mediated redox reaction. Two adjacent hydroxyl groups in the catechol group were oxidized to quinones in a basic condition, and donated two electrons for reduction of $Ag^+$ ions to form the Ag shell. In addition, the quinone-mediated crosslinking of dopamine-modified PAAc-b-PNIPAM was concurrent with the formation of the AgNPs in situ. Such a covalently bound polydopamine shell provides colloidal stability of Au@AgNPs and additional surface functionality by forming Michael type catechol-thiol addition with ligands.

Figure 2:
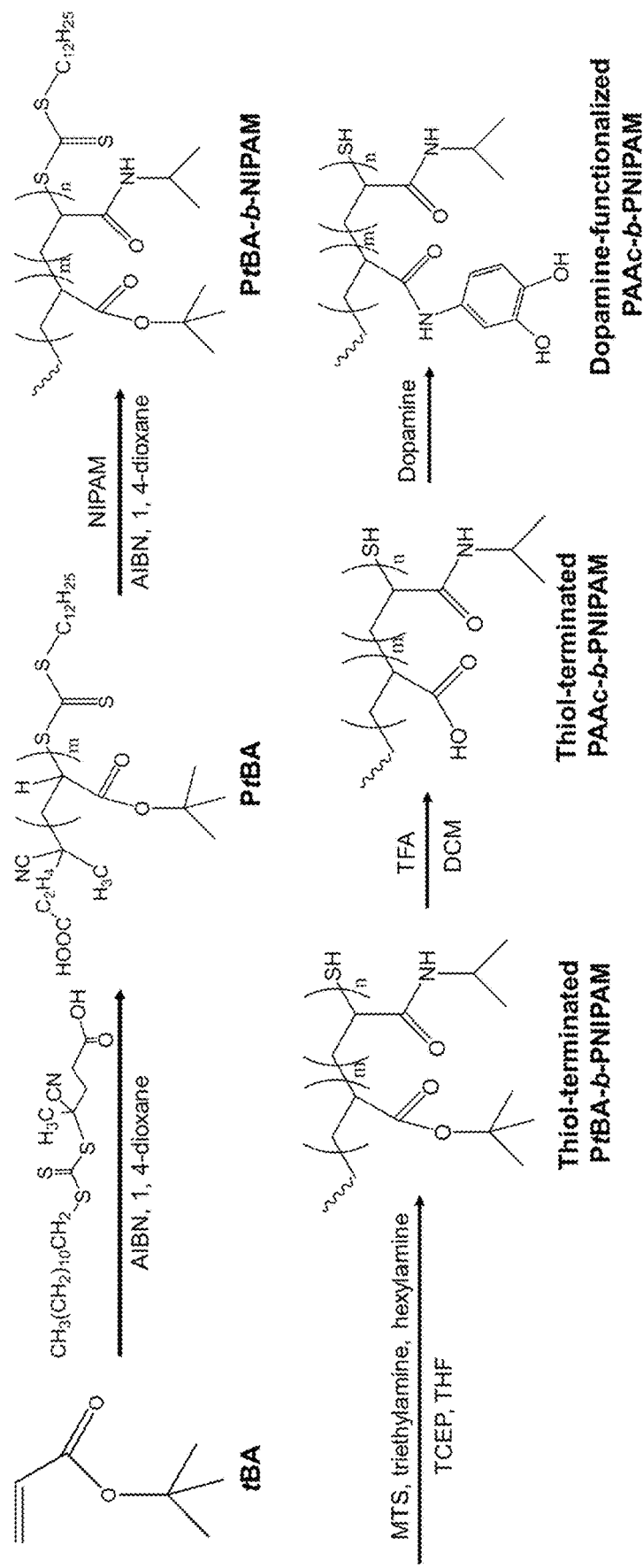
FIG. 2 shows a reaction scheme for dopamine-conjugated PAAc-b-PNIPAM via sequential reversible addition fragmentation chain transfer (RAFT) polymerization, aminolysis, hydrolysis process and covalent conjugation.

FIG. 2 shows a reaction scheme for dopamine-conjugated PAAc-b-PNIPAM via sequential RAFT polymerization, aminolysis, hydrolysis process and covalent conjugation. First, PtBA was synthesized through RAFT polymerization of tBA by using CDTPA as CTA and AIBN as an initiator under the condition of [tBA]/[CDTPA]/[AIBN]=1000/5/1. Sequentially, the di-block copolymer, PtBA-b-PNIPAM was synthesized through RAFT polymerization of NIPAM by using PtBA as macro-CTA (PtBA-CTA) under the condition of [NIPAM]:[PtBA-CTA]:[AIBN]=1500:5:1. The thiocarbonylthio group of the PtBA-b-PNIPAM was converted into a thiol end group by post-polymerization modification through an aminolysis process and reduction by TCEP for thiol-metal binding. The tert-butyl group of PtBA-b-PNIPAM was hydrolyzed by TFA to form thiol-terminated PAAc-b-PNIPAM. Finally, dopamine was chemically conjugated within the PAAc block of the copolymer on the AuNPs through EDC-NHS chemistry.

Figure 3:
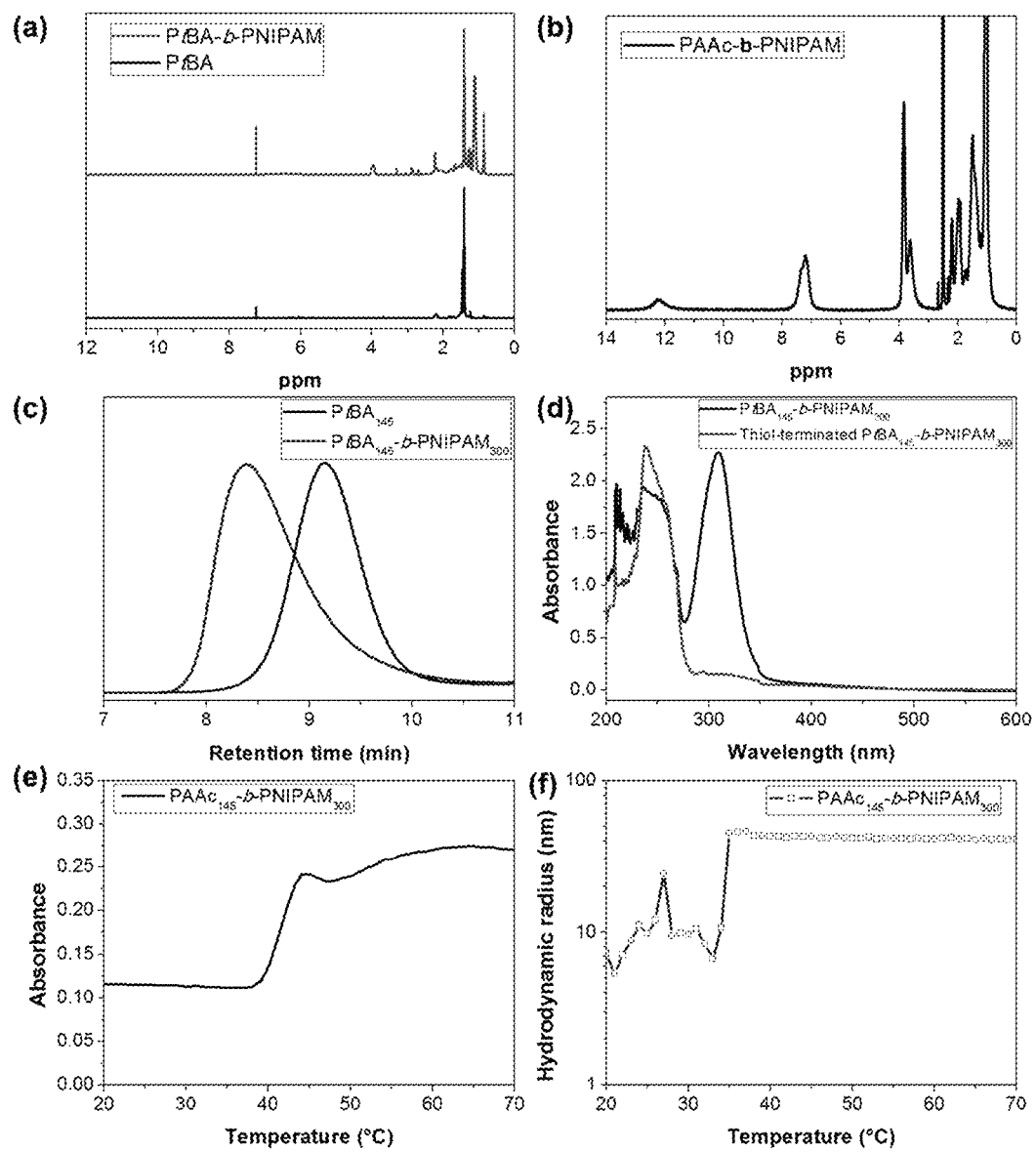
FIG. 3 shows (a) $^1$H NMR spectrum of PtBA and that of PtBA-b-PNIPAM, and (b) $^1$H NMR spectrum of PAAc-b-PNIPAM. In addition.

FIG. 3(a) and FIG. 3(b) show $^1H$ NMR spectrum of PtBA and that of PtBA-b-PNIPAM measured in $CDCl_3$. Based on the integrals of signals at 1.45 ppm, corresponding to the terminal methyl protons of PtBA block and at 0.9 ppm indicating terminal protons of the RAFT agent, the molecular weight ($Mn_{NMR}$) of PtBA was calculated to be 18,580 g/mol. The degree of polymerization of PtBA block was estimated to 145, based on the peak intensity ratio from the $^1$H NMR spectrum. After the synthesis of the PNIPAM block, a peak from the methine proton of the isopropyl group appeared at 3.9 ppm, and the degree of polymerization of the PNIPAM block from $PtBA_{146}$-CTA was calculated to be 300 under the condition of [NIPAM]:[PtBA-CTA]:[AIBN]= 1500:5:1 from the $^1$H NMR spectrum of PtBA-b-PNIPAM diblock copolymers. The $Mn_{NMR}$ of the PtBA-b-PNIPAM was estimated to be 52,530 g/mol through the comparison of the peak intensity ratios. In addition, FIG. 3(b) shows $^1$H NMR spectrum of PAAc-b-PNIPAM in DMSO-$d_6$, indicating disappearance of the tert-butyl protons at 1.45 ppm and a newly emerging proton peak of carboxyl group at 12.0 ppm. The PtBA block was completely deprotected by using TFA based on the $^1$H NMR spectrum of PAAc-b-PNIPAM. FIG. 3(c) shows GPC traces of PtBA and PtBA-b-PNIPAM using THF as a mobile phase to characterize the molecular weight and polydispersity index (PDI) in terms of retention time, indicating the monomodal molecular weight distribution of both polymers. $PtBA_{145}$ has a weight-average molecular weight of 25,590 g/mol with a PDI of 1.21. $PtBA_{145}$-b-$PNIPAM_{300}$ has a weight-average molecular weight of 70,950 g/mol with a PDI of 1.27. FIG. 3(d) shows UV-Vis absorption graph of PtBA-b-PNIPAM measured in chloroform before and after aminolysis. After the removal of the thiocarbonylthio group from PtBA-b-PNIPAM via aminolysis and the subsequent reduction of terminal methyl disulfide groups into thiol, the absorption peak at 307 nm disappeared.

In addition, the intrinsic thermal transition behavior of PAAc-b-PNIPAM was characterized by measuring UV absorbance and hydrodynamic radius as a function of temperature as shown in FIG. 3(e) and FIG. 3(f). As previously reported, thermally-responsive poly(NIPAM)-based copolymers are soluble below the lower critical solution temperature (LOST), and are insoluble above the LOST due to a collapse of poly(NIPAM) chains through hydrophobic interactions, leading to sharp phase transitions. A copolymer solution was prepared at a final concentration of 0.05 w/v % in 10 mM PBS at pH 7.4. The LOST was determined at temperature showing the maximal value of the first derivative of UV absorbance. The transition temperature (LOST) of $PAAc_{145}$-b-$PNIPAM_{300}$ was found to be 40.9° C. In addition, DLS was used to measure the hydrodynamic radius of the PAAc-b-PNIPAM diblock copolymer as a function of temperature. The onset temperature of phase transition observed by UV absorbance and DLS was different due to the heating rate effect. The hydrodynamic radius of $PAAc_{145}$-b-$PNIPAM_{300}$ was 17.7 nm at 25° C. and 42.0 nm at 50° C., indicating that self-assembled micelles were formed above the LOST. The PAAc-b-PNIPAM diblock copolymers initially exist as unimers in PBS below LOST, but show micellar structures including PNIPAM as the core and PAAc as the shell, while the PNIPAM block became dehydrated and collapsed above LOST.

Figure 4:
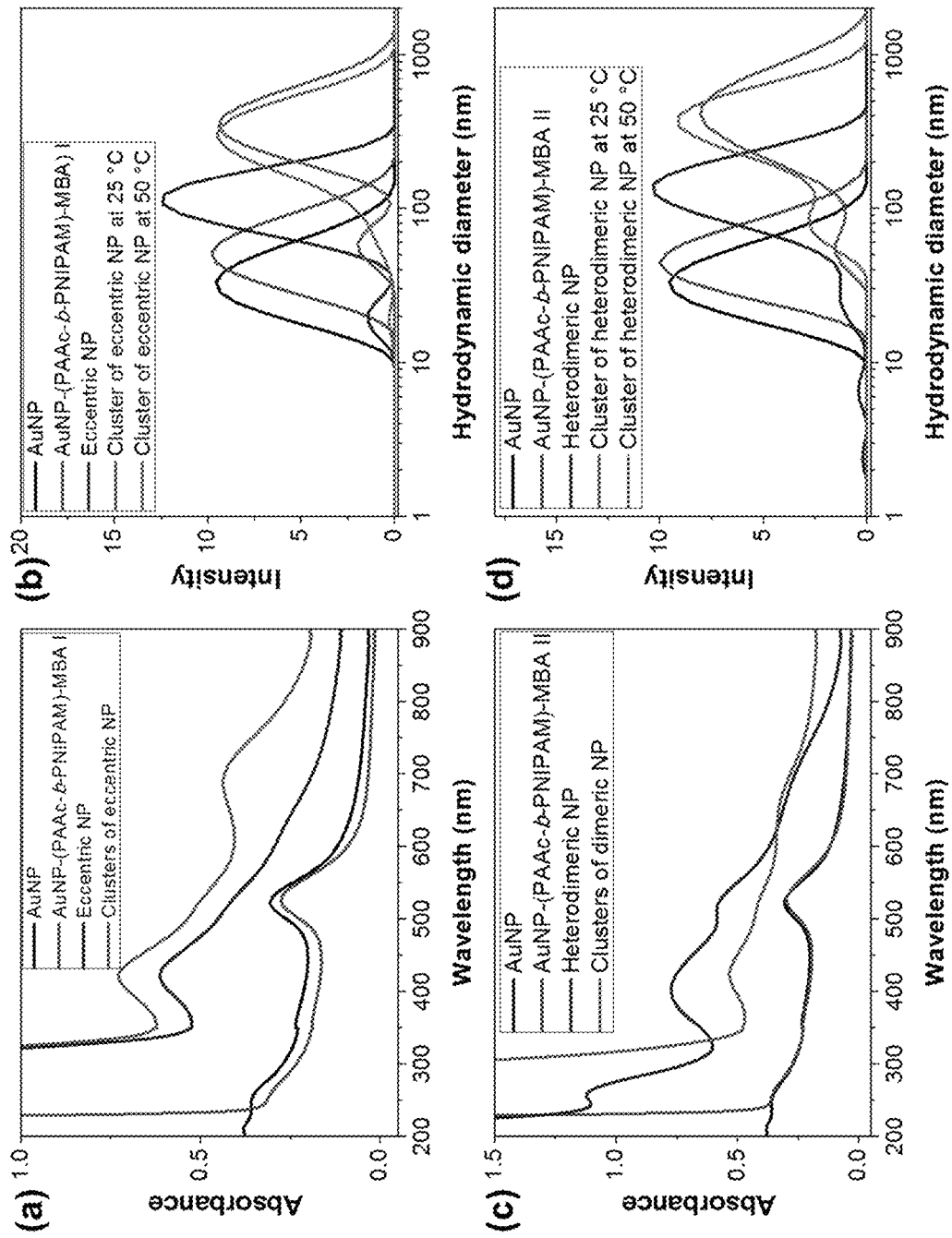
FIG. 4 shows (a, c) UV-Vis absorption spectra and (b, d) hydrodynamic diameters of eccentric NPs, heterodimeric NPs and their clusters at 25° C. and 50° C.

FIG. 4(a) and FIG. 4(b) show plots of absorption wavelength and hydrodynamic diameter of eccentric NPs and their clusters. An absorption peak of the original AuNPs centered at 522 nm became red-shifted to 525 nm after the coordination of PAAc-b-PNIPAM and MBA to form AuNP-(PAAc-b-PNIPAM)-MBA I, due to a change in refractive index. In addition, a new resonance peak with a maximum absorbance was observed at 420 nm and the LSPR band of AuNP was blue-shifted, indicating that the Ag compartment was anisotropically formed on the Au seeds via catechol-mediated redox reaction. After incubation with basic NaCl solution, no shift of Ag absorption peak was observed and the resultant spectra exhibited a new LSPR band at 690 nm because of the plasmon absorption bands of aggregated MNPs, suggesting directional clustering of eccentric NPs. Furthermore, the plasmon peak of the quinone moiety at 390 nm was co-evolved during the reaction and overlapped with that of AgNPs during reaction, making it difficult to observe. DLS was used to characterize particle diameters and distribution of eccentric NPs and their clusters at 25° C. and 50° C. in PBS. As shown in FIG. 4(b), the original AuNPs have an average size of 22.8±0.1 nm in deionized water. After conjugation of PAAc-b-PNIPAM with MBA at a molar ratio of MBA to PAAc-b-PNIPAM of 7.75, the average diameter of the particles was increased to 34.7±0.9 nm.

In addition, the hydrodynamic diameter of eccentric BMNPs and that of their nanoclusters were 83.0±1.5 nm and 275.1±3.5 nm at 25° C. in PBS, respectively. The directional clustering was simply achieved by salt-induced aggregation in a basic condition, since repulsion between Au compartments was reduced while still providing colloidal stability by virtue of the presence of a crosslinked polydopamine layer and deprotonated PAAc block within Ag compartments. As the temperature is increased from 25° C. to 50° C., the PNIPAM chains of the copolymer positioned in the nanogap became reduced and the average diameter was decreased to 256.5±5.4 nm. This result indicates that the interior nanogap between the Au and Ag compartments was controlled by a conformational change of PNIPAM block from a swelled state to a collapsed state. FIG. 4(c) shows the LSPR absorption bands of heterodimeric NPs and their clusters. After formation of the Ag compartment, the new absorption peak of Ag compartment was observed at 402 nm and the Au peak became blue-shifted to 508 nm. In addition, a new plasmon mode was confirmed at 680 nm, which corresponds to strong plasmon coupling within the nanogap region of heterodimeric BMNPs. When these particles were directionally clustered, the overall LSPR peak became red-shifted and the peak intensity at 680 nm was increased. FIG. 4(d) shows hydrodynamic diameters of heterodimeric NPs and their clusters at 25° C. and 50° C. in PBS. When PAAc-b-PNIPAM and MBA were coordinated on the AuNP at a molar ratio of MBA to PAAc-b-PNIPAM of 1.94, the average diameter of AuNP-(PAAc-b-PNIPAM)-MBA II was 32.2±0.9 nm. In addition, the hydrodynamic diameter of heterodimeric BMNPs and that of their nanoclusters were 86.7±2.3 nm and 311.5±4.3 nm at 25° C. in PBS, respectively. When the temperature was increased to 50° C., the average size was decreased to 289.6±5.0 nm.

Figure 5:
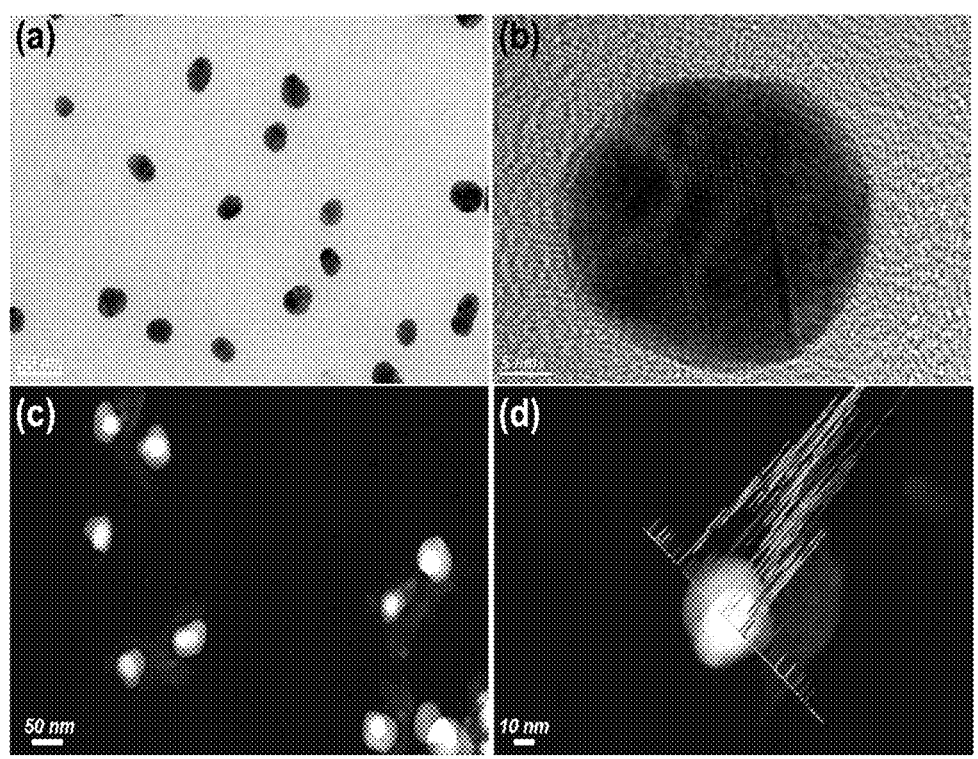
FIG. 5 shows (a, b) TEM images of AuNPs and (c, d) high-angle annular dark-field (HAADF) images of eccentric BMNPs at different magnification ratios, wherein the scale bars represent (a, c) 50 nm, (b) 5 nm and (d) 10 nm.
Figure 6:
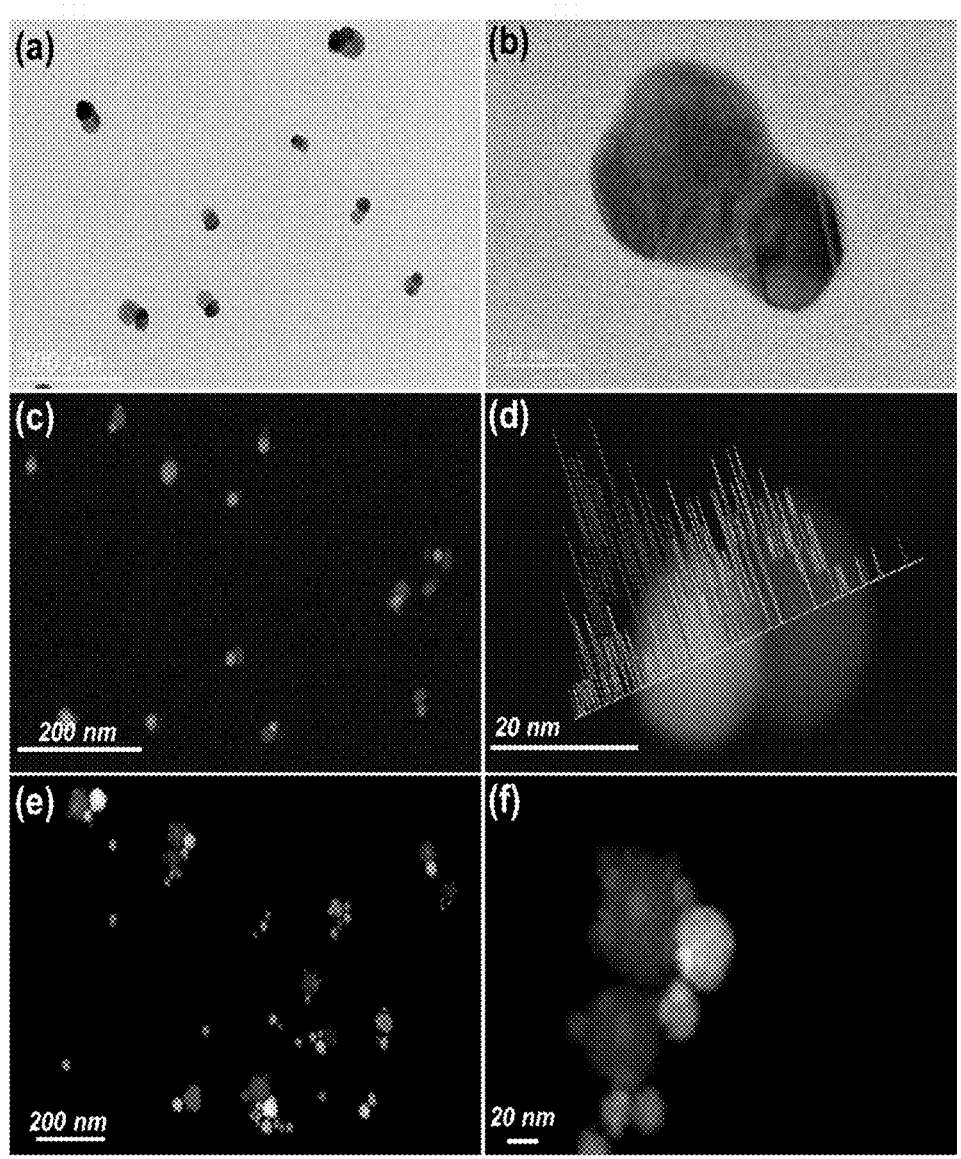
FIG. 6 shows (a) TEM image of heterodimeric BMNPs, (b) TEM image of clusters of heterodimeric BMNPs, (c) HAADF image of heterodimeric BMNPs and (d) HAADF image of clusters of heterodimeric BMNPs at different magnification ratios, wherein the scale bars represent (a, c, e) 200 nm and (b, d, f) 20 nm.

FIG. 5(a) and FIG. 5(b) show AuNPs prepared by a seeded-growth method using citrate reduction procedure. After competitive coordination of two ligands at a molar ratio of MBA to PAAc-b-PNIPAM of 7.75 and chemical conjugation of dopamine within the PAAc block, Ag compartments were eccentrically formed on Au seeds via the catechol redox chemistry. As shown in FIG. 5(c) and FIG. 5(d), the high-angle annular dark field (HAADF) images with line profiles represent clear eccentric BMNPs, wherein the bright part corresponds to the Au element and the gray part corresponds to the Ag element. In addition, the TEM images of heterodimeric BMNPs were shown in FIG. 6(a) and FIG. 6(b). When two immiscible ligands were used at a molar ratio of 1.94, the morphology of BMNPs was changed from an eccentric form to a heterodimeric form due to a decreased coverage of the copolymer on the Au seeds. FIG. 6(c) and FIG. 6(d) show HAADF images of heterodimeric NPs along with the relevant line profile, wherein the red line represents the Au compartment and the blue line represents the Ag compartment. Particularly, when a salt was added to the particle solution under a basic condition, the heterodimeric NPs were directionally clustered into supraparticular nanostructures, as shown in FIG. 6(e) and FIG. 6(f).

Figure 7:
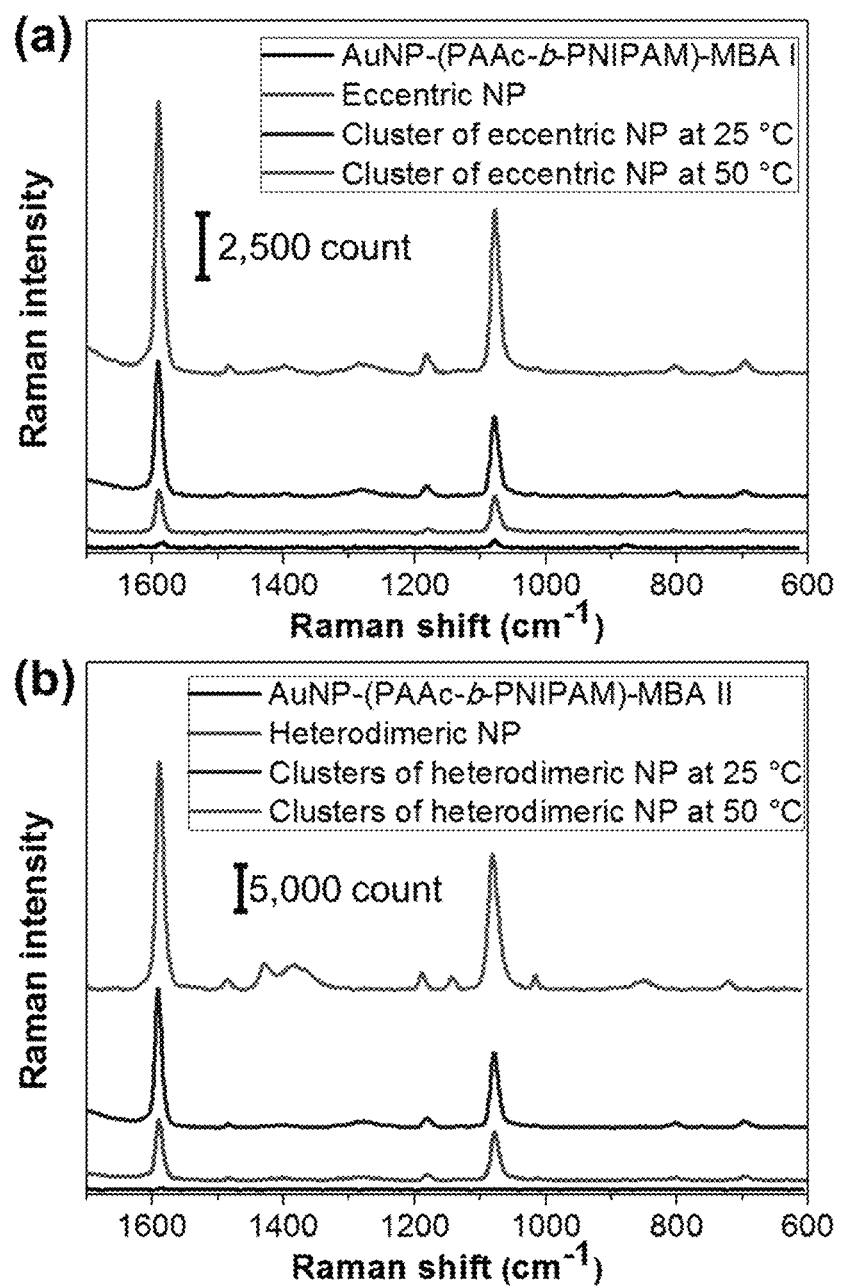
FIG. 7 shows Raman spectra of (a) eccentric BMNPs, (b) heterodimeric BMNPs and clusters thereof at 25° C. and 50° C.

FIG. 7 shows Raman spectra of the MBA-embedded BMNPs at 25° C. and 50° C. The MBA molecules were introduced into the crosslinked polydopamine moiety via Michael addition reaction between catechol and thiol. As shown in FIG. 7(a), AuNP-(PAAc-b-PNIPAM)-MBA I exhibited negligible Raman signals similar to the background spectrum at 25° C. When plasmonic nanogaps of eccentric NPs were formed between two compartments and the MBA molecules were embedded therein, the SERS signals were generated due to electromagnetic field confinement in the nanometer-range of nanogap. The clusters of eccentric NPs prepared by salt-induced aggregation in a basic condition showed highly enhanced SERS signals due to electromagnetic field enhancement at interparticle junctions. In addition, the temperature-sensitive PNIPAM block layer collapsed at 50° C., and optical properties of BMNPs showed 2-fold improvement as the nanogap between the Au and Ag compartments was decreased. Such increased Raman signals were attributed to a collapse of the PNIPAM block of the copolymer, causing the MBA molecules to closely contact with the Au core. In particular, the EF values of the eccentric NPs and their nanoclusters were estimated to be $3.99 \times 10^4$ and $1.27 \times 10^5$. FIG. 7(b) shows Raman spectra of AuNP-(PAAc-b-PNIPAM)-MBA II, heterodimeric NPs and their clusters. The EF values of heterodimeric NPs and their nanoclusters were $1.59 \times 10^5$ and $3.75 \times 10^5$. SERS signals of heterodimeric BMNPs were much stronger than those of eccentric structures, due to a sharper region between the Au and Ag compartments. Furthermore, Raman signals of their nanoclusters were increased approximately 1.64 times with a decrease in internal nanogap at 50° C.

The invention claimed is:

1. A bimetallic nanostructure with stimuli-responsiveness, comprising:
    a metal seed comprising a first portion and a second portion;
    a nanogap including a dopamine-modified stimuli-responsive copolymer attached to the first portion of the metal seed; and
    a metal shell surrounding the nanogap,
    wherein the first portion of the metal seed is enclosed by the nanogap and the second portion of the metal seed is exposed onto a surface of the bimetallic nanostructure, and
    wherein a small molecule ligand selected from the group consisting of 4-aminothiophenol (ATP), 1,4-benzenedithiol (BDT), 4-mercaptobenzoic acid (MBA) and 2-mercaptobenzoimidazole-5-carboxylic acid (MBIA), is bound to the second portion of the metal seed,
    wherein the dopamine-modified stimuli-responsive copolymer is a diblock copolymer consisting of a hydrophilic polymer block and a stimuli-responsive polymer block,
    wherein the small molecule ligand and the stimuli-responsive copolymer are in competitive ligand coordination,
    wherein the stimuli-responsive polymer block is selected from the group consisting of poly(N-isopropylacrylamide) (polyNIPAM), poly(N,N'-diethyl acrylamide) (polyDEAAm), poly(dimethylaminoethyl methacrylate) (polyDMAEMA), poly(N-(L)-(1-hydroxymethyl) propyl methacrylamide), poly[oligo(ethylene glycol) methyl ether methacrylate (POEGMA), poly(2-vinyl pyridine) (P2VP), poly(4-vinyl pyridine) (P4VP) and a combination thereof, and
    wherein a size of the nanogap is increased at a temperature less than a lower critical solution temperature of the dopamine-modified stimuli-responsive copolymer, while the size of the nanogap is decreased at a temperature equal to or more than the lower critical solution temperature of the dopamine-modified stimuli-responsive copolymer, such that the size of the nanogap is controlled by temperature.

2. The bimetallic nanostructure according to claim 1, wherein the metal seed and the metal shell are selected from the group consisting of gold, silver, copper and a combination thereof, and the metal seed and the metal shell are not the same.

3. The bimetallic nanostructure according to claim 1, wherein the hydrophilic polymer block is selected from the group consisting of poly(acrylic acid), poly(methacrylic acid), poly(itaconic acid), poly(maleic acid) and a combination thereof.

4. The bimetallic nanostructure according to claim 1, wherein the nanogap further comprises a Raman dye.

5. A metal nanoprobe for detection of a surface-enhance Raman scattering (SERS)-based target material, using the bimetallic nanostructure as defined in claim 4.

6. The bimetallic nanostructure according to claim 1, which has an eccentric form or heterodimeric form.

7. A bimetallic nanocluster structure formed by aggregation of the bimetallic nanostructure as defined in claim 1.

8. A method for producing the bimetallic nanostructure with stimuli-responsiveness of claim 1, comprising the steps of:
    i) preparing the seed metal;
    ii) adding the small molecule ligand and a thiol-terminated stimuli-responsive copolymer as a polymeric ligand to the seed metal;
    iii) carrying out competitive coordination of the small molecule ligand and the polymeric ligand onto the metal seed, and allowing the seed metal to be bound with the thiol groups so that the stimuli-responsive copolymer may be deposited only at a portion of the metal seed, thereby forming the nanogap;
    iv) adding dopamine to the seed metal mixture having the nanogap formed from step iii) to introduce catechol groups to the stimuli-responsive copolymer; and
    v) adding a metal precursor to the stimuli-responsive copolymer modified with the seed metal-dopamine so that catechol may be oxidized and metal precursor ions may be reduced via catechol-mediated redox reactions without any reducing agent, thereby forming the metal shell and providing the bimetallic nanostructure.

9. The method for producing a bimetallic nanostructure according to claim 8, wherein an eccentric or heterodimeric form of bimetallic nanostructure is obtained by controlling the addition ratio of the small molecule ligand and polymeric ligand, in step ii).

10. The method for producing a bimetallic nanostructure according to claim 8, wherein the small molecule ligand is at least one selected from the group consisting of 4-aminothiophenol (ATP), 1,4-benzenedithiol (BDT), 4-mercaptobenzoic acid (MBA) and 2-mercaptobenzoimidazole-5-carboxylic acid (MBIA), and the stimuli-responsive copolymer as the polymeric ligand is a diblock copolymer consisting of a hydrophilic polymer block and a stimuli-responsive polymer block.

11. The method for producing a bimetallic nanostructure according to claim 10, wherein the hydrophilic polymer block is selected from the group consisting of poly(acrylic acid), poly(methacrylic acid), poly(itaconic acid), poly(maleic acid) and a combination thereof; and the stimuli-responsive polymer block is selected from the group consisting of poly(N-isopropylacrylamide) (polyNIPAM), poly(N,N'-diethyl acrylamide) (polyDEAAm), poly(dimethylaminoethyl methacrylate) (polyDMAEMA), poly(N-(L)-(1-hydroxymethyl) propyl methacrylamide), Poly[oligo(ethylene glycol) methyl ether methacrylate (POEGMA), poly(2-vinyl pyridine) (P2VP), poly(4-vinyl pyridine) (P4VP) and a combination thereof.

12. The method for producing a bimetallic nanostructure according to claim 8, which further comprises a step of controlling a nanogap size by varying temperature, after step v).

13. The method for producing a bimetallic nanostructure according to claim 8, wherein a Raman dye is further added in step v).

14. The method for producing a bimetallic nanostructure according to claim 8, wherein each of the seed metal and a shell metal in the metal seed and the metal shell is selected from the group consisting of gold, silver, copper and a combination thereof, and the seed metal and shell metal are not the same.

15. The method for producing a bimetallic nanostructure according to claim 8, further comprising a step of adding a salt solution to cause aggregation of the bimetallic nanostructures by salt-induced reaction, thereby forming bimetallic nanoclusters, after step v).

* * * * *